United States Patent
Fallows

(10) Patent No.: US 9,332,090 B1
(45) Date of Patent: May 3, 2016

(54) COMMUNICATION DATA PADDING

(71) Applicant: Kaazing Corporation, Mountain View, CA (US)

(72) Inventor: John R. Fallows, Palo Alto, CA (US)

(73) Assignee: Kaazing Corporation, San Jose, CA (US)

( * ) Notice: Subject to any disclaimer, the term of this patent is extended or adjusted under 35 U.S.C. 154(b) by 244 days.

(21) Appl. No.: 14/024,379

(22) Filed: Sep. 11, 2013

Related U.S. Application Data

(60) Provisional application No. 61/700,212, filed on Sep. 12, 2012.

(51) Int. Cl.
*G06F 15/16* (2006.01)
*H04L 29/06* (2006.01)

(52) U.S. Cl.
CPC .................................... *H04L 69/04* (2013.01)

(58) Field of Classification Search
CPC ... H04N 1/41; H04L 47/6205; H04L 49/9094
See application file for complete search history.

(56) References Cited

U.S. PATENT DOCUMENTS

| | | | | |
|---|---|---|---|---|
| 5,907,363 | A * | 5/1999 | Botsford et al. | 375/240.05 |
| 6,005,979 | A * | 12/1999 | Chang | H04N 1/41 382/232 |
| 9,003,104 | B2 * | 4/2015 | Joshi et al. | 711/103 |
| 2001/0055319 | A1 * | 12/2001 | Quigley et al. | 370/480 |
| 2003/0120797 | A1 * | 6/2003 | Brodeur et al. | 709/236 |
| 2005/0228911 | A1 * | 10/2005 | Fuehrer et al. | 710/106 |
| 2006/0095590 | A1 * | 5/2006 | Miller | H04L 69/04 709/246 |
| 2007/0290895 | A1 * | 12/2007 | Mitchell | G06K 15/00 341/50 |
| 2009/0287843 | A1 * | 11/2009 | Morimura | 709/236 |
| 2010/0265525 | A1 * | 10/2010 | Hagiwara | 358/1.9 |
| 2011/0317547 | A1 * | 12/2011 | Baudoin | H04L 65/607 370/216 |
| 2014/0073948 | A1 * | 3/2014 | Engelbrecht et al. | 600/476 |

* cited by examiner

*Primary Examiner* — Jonathan Bui
(74) *Attorney, Agent, or Firm* — Van Pelt, Yi & James LLP

(57) ABSTRACT

Sending padding data is disclosed. Uncompressed communication data in a first data grouping is prepared using a data compression algorithm. A header of the first data grouping identifies that the first data grouping includes uncompressed contents. A second data grouping is selected. The second data grouping includes compressed padding data configured to fill a buffer of a receiver to at least a predetermined size. The first data grouping and the second data grouping are sent.

22 Claims, 10 Drawing Sheets

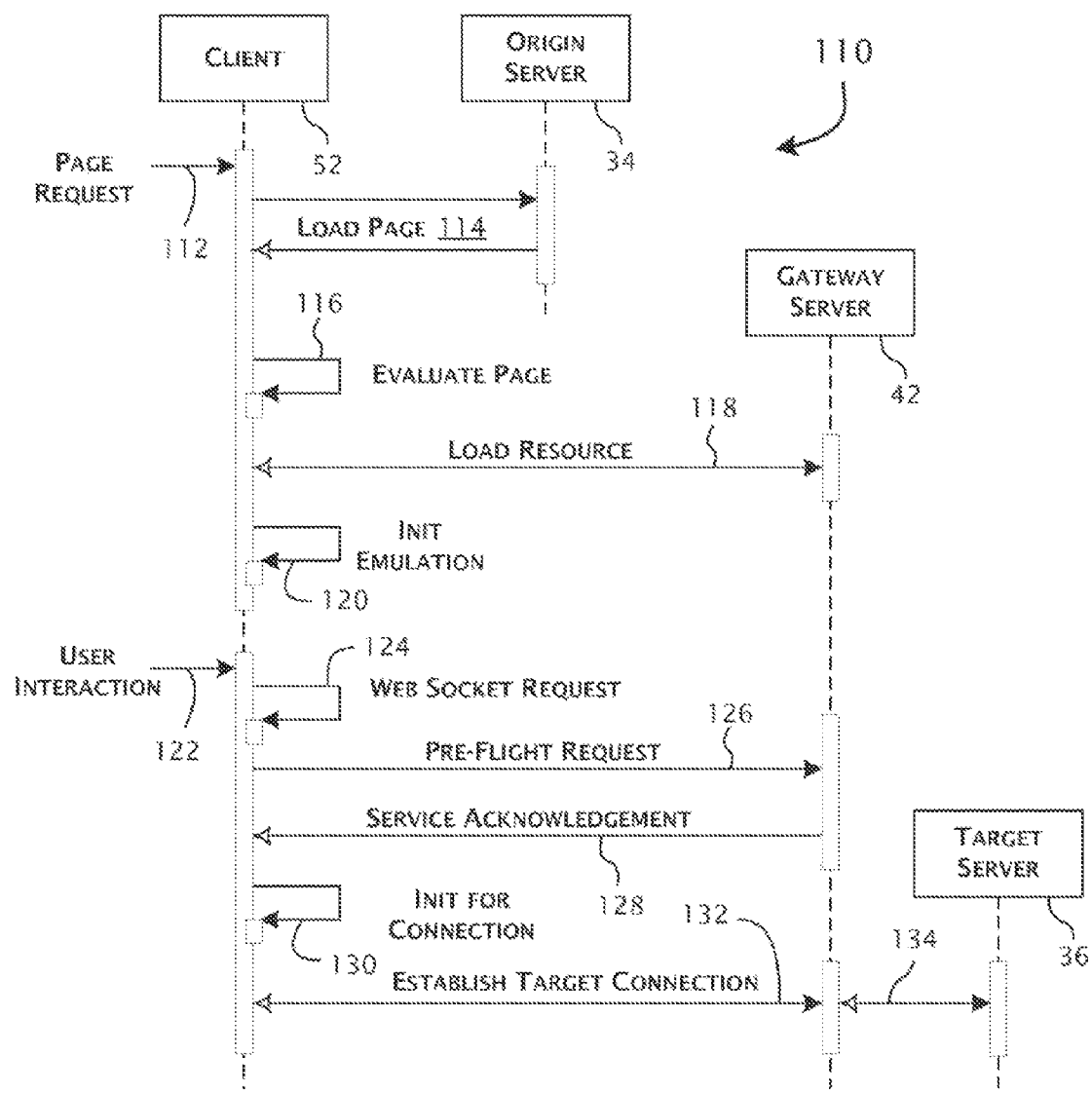

COMMUNICATION DATA PADDING

CROSS REFERENCE TO OTHER APPLICATIONS

This application claims priority to U.S. Provisional Patent Application No. 61/700,212 entitled WEBSOCKET EMULATION filed Sep. 12, 2012 which is incorporated herein by reference for all purposes.

BACKGROUND OF THE INVENTION

In some web browsers, such as a standard web browser on an Android operating system of Google Inc. of Mountain View, Calif., HTTP response payload data is buffered and delivered to a webpage application in segments of predetermined size (e.g., 4K) until the response is complete. This causes an HTTP response received at the client that is less than the predetermined size (e.g., less than 4K in size) to be not delivered to the application until the predetermined size amount of data has been received, causing undesirable delays (e.g., increased latency) in data delivery to the webpage application.

This problem becomes more apparent when attempting to utilize an HTTP connection to emulate a real-time, full-duplex bidirectional communication connection. While the development and use of web applications continues to grow, a significant limitation exists in that the widely used HTTP protocol only supports half-duplex communication. As in the case of conventional client-server application use models, a continuous tier-to-tier bidirectional, or full-duplex communications connection is highly desirable, if not required to enable client interaction with various backend systems. The demand for real-time services on the Web, such as to display real-time stock feeds, permit ad-hoc information updates, enable active participation among multiple users in real-time operations, particularly as encountered in bidding, chat, games, and other applications, is substantial and increasing. When an HTTP connection is utilized to emulate a real-time full-duplex bidirectional communication connection to an application, a data sent to the application may be held in a buffer of a web browser until a predetermined amount of data has been received by the web browser. Waiting for the predetermined amount of data to be delivered renders the emulated real-time full-duplex bidirectional communication connection to be no longer real-time.

The HTML5 specification defines new protocol features, including WebSockets, Server-Sent Events, and associated access security requirements, as a way of enabling reliable bidirectional communications using the HTTP protocol. The HTML5 specification standardizes, among other things, full-duplex, direct TCP communication. However, functional incorporation and operational uniform adoption of WebSocket into all web browsers will not likely occur for many years. Further, resistance to update existing in-place web browsers due to practical, business, and other limitations will likely prevent wholesale adoption for many more years.

Consequently, there exists a need for a reliable way to ensure that received data is delivered in real-time and not trapped in a buffer.

BRIEF DESCRIPTION OF THE DRAWINGS

Various embodiments of the invention are disclosed in the following detailed description and the accompanying drawings.

FIG. 7 is a sequence diagram illustrating the initialization and execution of a Web-browser client application in establishing an emulated WebSocket network connection in accordance with a preferred embodiment of the present invention.

DETAILED DESCRIPTION

Figure 1:
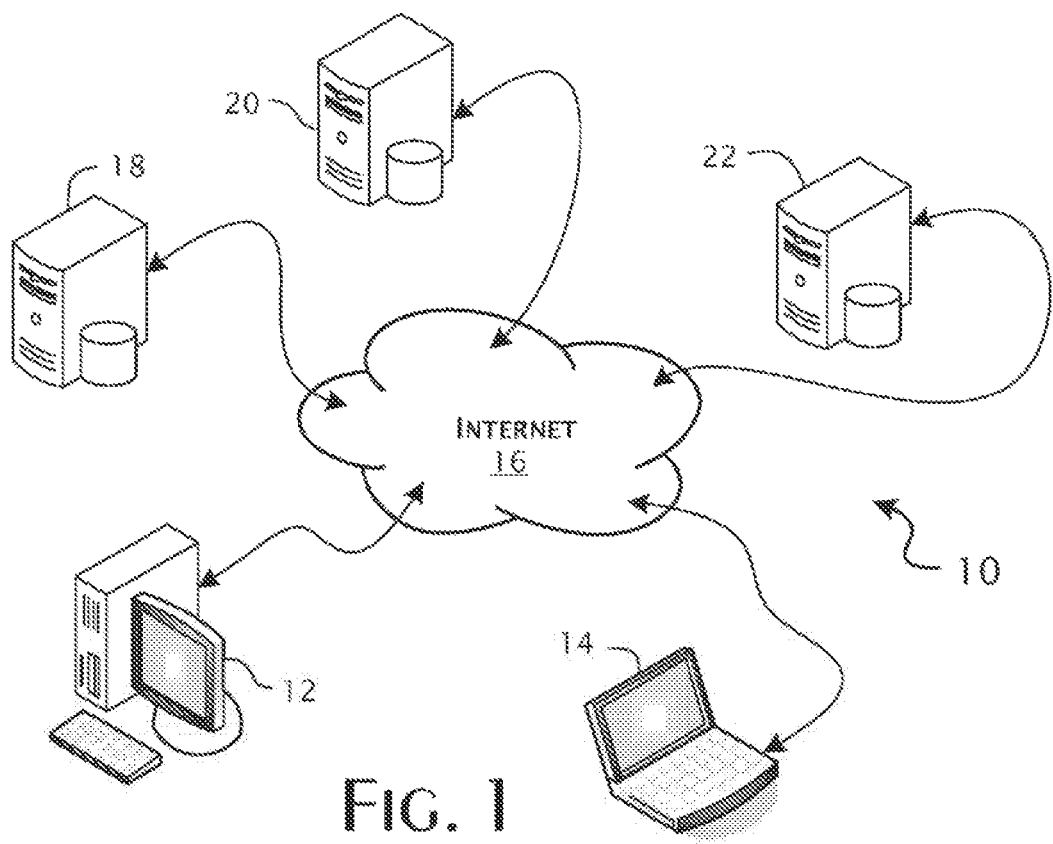
FIG. 1 is a general illustration of a preferred operating environment for a preferred embodiment of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Sending padding data is disclosed. In some embodiments, uncompressed communication data in a first data grouping is prepared using a data compression algorithm. The header of the first data grouping identifies that the first data grouping includes uncompressed content. For example, payload data desired to be sent is prepared in a first data block of a compression algorithm as a raw/literal data that is not compressed. A second data grouping is selected. The second data grouping includes compressed padding data configured to fill a buffer of a receiver to at least a predetermined size. For example, a precomputed data block that when uncompressed by the receiver expands to fill the buffer to at least the predetermined size is required to cause a receiver ensure delivery of the first data grouping out of the buffer of the receiver to an application. In some embodiments, the first data grouping is ordered before the second data grouping when the first data grouping and the second data grouping are sent to the receiver. In other embodiments, the first data grouping is ordered after the second data grouping when the first data grouping and the second data grouping are sent to the receiver.

In some embodiments, a system enables service communications in distributed Web applications between servers otherwise inaccessible due to cross-origin security restrictions in pre-HTML5 compliant Web-browser clients. A Web-browser client executes a client-side Web application received from a source origin server having a defined source origin and requests connections to request identified Web-application services. Execution of an emulation client library establishes a bidirectional capable HTTP-based communications connection between the Web-browser client and a gateway server, having a target origin outside the scope of the source origin, providing access to the request identified Web-application service. The bidirectional capable HTTP-based communications connection includes a cross-origin communications bridge providing a secure communications path between the source and target origins. The gateway server can establish an HTML5 compliant connection to a target defined service, provided by a target server, having a predefined relation to the request identified Web-application service.

In some embodiments, an efficient gateway server system architecture that enables real-time bidirectional browser communications consistent, where applicable, with the currently proposed HTML5 specification is provided.

In some embodiments, a system enabling service communications in distributed Web applications between servers otherwise inaccessible due to cross-origin security restrictions in pre-HTML5 compliant Web-browser clients is provided. A Web-browser client executes a client-side Web application received from a source origin server having a defined source origin and requests connections to request identified Web-application services. Execution of an emulation client library establishes a bidirectional capable HTTP-based communications connection between the Web-browser client and a gateway server, having a target origin outside the scope of the source origin, providing access to the request identified Web-application service. The bidirectional capable HTTP-based communications connection includes a cross-origin communications bridge providing a secure communications path between the source and target origins. The gateway server can establish an HTML5 compliant connection to a target defined service, provided by a target server, having a predefined relation to the request identified Web-application service.

In some embodiments, distributed Web applications can be implemented generally without regard to whether participating Web-browser clients are fully HTML5 compliant. By implementing distributed Web applications using an embodiment of the present invention, appropriate message handling delivery is assured between backend systems and services all the way to the Web-browser clients in a manner functionally compliant with the HTML5 Specification. Furthermore, the preferred embodiments are functionally compliant with the HTML5 standard. Natively compliant HTML5 Web-browser clients may transparently participate with and within the distributed Web applications supported without need to change server or client application code.

In some embodiments, the client emulation libraries provide both binary and text-based protocol support. Binary protocol support is a highly desirable specification extension that allows feature enhancement of otherwise text-only Web-socket protocols as well as generally enabling raw TCP communication between client and server. The provision of binary protocol support is efficiently interfaced into the Web-Sockets protocol support without affecting HTML5 compliance. Natively compliant HTML5 Web-browser clients equally benefit from and can use binary protocols.

In some embodiments, the Web-browser client emulation stack and interoperation with the gateway server are highly performant. Message delivery is resilient. Since all connectivity, including connections for downstream Server-Sent Event requests, is client initiated, communications between the client and the gateway servers can seamlessly traverse firewalls and proxy servers due to implementing the HTTP protocol. In case of a broken connection or lost request, the client-side Web application can choose to automatically reconnect, guaranteeing message delivery. The reconnection operation is preferably implemented as a client protocol library 84. Additionally, the emulation layer can automatically recognize and honor the local Web-browser client's proxy settings, eliminating any potential problems with connections that must pass through a Web proxy server. Further, the client libraries can be implemented in different client technologies and, in all cases, provide appropriate APIs to allow protocol transactions for services. Complex servlet-based and other custom server side support logic, potentially involving multiple client/server communications transactions, is not required to implement application server logic. Rather, the Web-browser client application can communicate with text and, as appropriate, binary data packages, thereby reducing communications overhead, complexity, and execution latency. The distributed Web application architecture represented by the present invention scales easily to support very large user communities, even in the context of worldwide commercial applications.

In some embodiments, the gateway servers provide an easily administered control over the set of services and origin servers that are accessible in the context of distributed Web-application and, thereby by any particular set of Web-browser clients.

In some embodiments, the use of the gateway servers provide an efficient basis for broadcast and multicast notification of data available or sent from one or more backend services to all participating, connected Web-browser clients. Backend data sources can send data to one or few involved gateway servers, thereby allowing distribution in an efficient manner to the gateway server supported Web-browser clients as new Server-Sent Event notifications from a single point of contact.

In some embodiments, the emulation client library can be used to support many different specialized client protocols. Any distributed Web application that requires a specific or even proprietary client protocol can be supported efficiently by adjusting the client library resources that are available for download through the gateways servers.

In some embodiments, the need for real-time, full-duplex communications capabilities substantially independent of the current native capabilities of client Web-browsers that may be used to access Web services is satisfied. In the following detailed description of the invention, like reference numerals are used to designate like parts depicted in one or more of the figures.

The draft HTML5 specification, including supporting specifications, defines the native architecture and operational features of WebSockets and Server-Sent Events (SSE) recommended for implementation in Web-browser and similar HTTP-based client applications. WebSockets and Server-Sent Events are premised on client applications being capable of utilizing full-duplex, direct TCP communication channels. In application 10, relevant to the present invention and as generally shown in FIG. 1, conventional client systems 12, 14 execute web-browser applications to access through the public Internet, private intranet, or other communications network 16, one or more remote server systems 18, 20, 22 to bidirectionally request and receive real-time information. In typical instances, an information request made through a Web-browser client executed by a client system 12 is directed initially to a primary or source server 18 and real-time, bidirectional information feed connections are established, as needed with other secondary servers 20, 22. For example, a Web-page may be requested from the source server 18 that, within appropriate designated window areas within the user interface representation of the delivered page, presents real-time news stories from a news source server 20 and stock pricing information from a stock information server 22.

Conventionally, the transparent establishment of the real-time bidirectional, secondary connections with the servers 20, 22 in coordination with the source server 18 depends on native support for WebSockets and Server-Sent Event support in the Web-browser clients executed by the client systems 12, 14. Absent widespread native WebSockets and Server-Sent Events support, further in a manner that is compatible across all major independent Web-browser client implementations, establishment of WebSocket-based systems, commercial or otherwise, is not practical.

In accordance with the present invention, a gateway service is provided to enable conventional pre-HTML5 compliant Web-browser client implementations to immediately support fully compliant WebSockets and Server-Sent Events, even where specific Web-browser implementations have no or only some partial native implementation of the HTML5 standard. This gateway service may be implemented on an existing server 18, 20, 22 or, as in the preferred embodiments, on a separate dedicated gateway server system. Conforming native feature implementations, typically partial in nature, may be utilized where appropriate. Otherwise, the present invention implements an emulation system that achieves a functionally compliant system consistent with HTML5 specification conformant native implementations.

Figure 2:
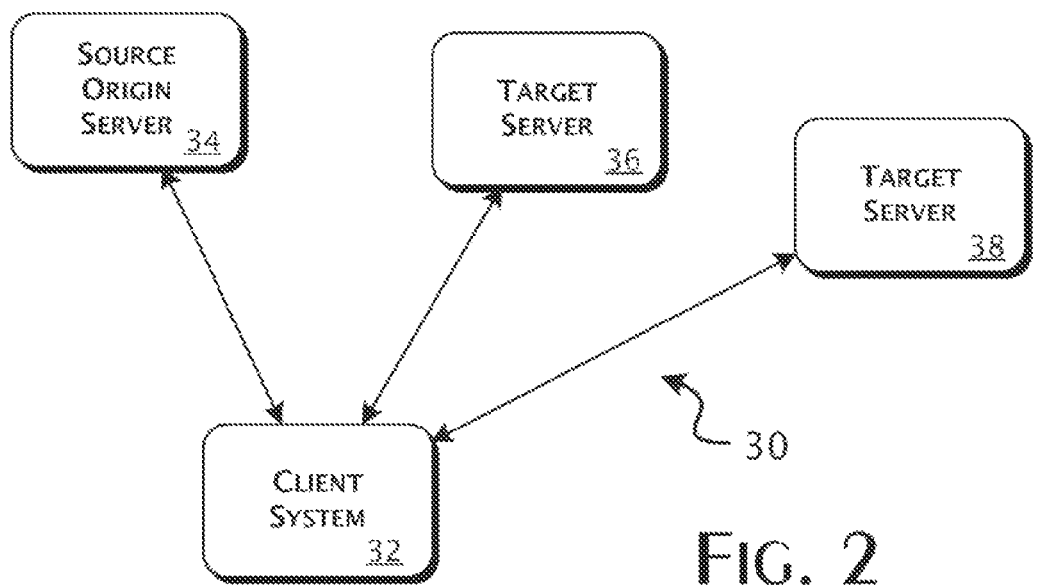
FIG. 2 is a block diagram illustrating a client/server system appropriate for the implementation of preferred embodiments of the present invention in implementing a distributed client/server Web application.

Referring to FIG. 2, effective emulation of various aspects of WebSockets and Server-Sent Events is conventionally precluded by established security and functional limitations built into existing conventional standards compliant Web browsers, specifically those not fully compliant with the draft HTML5 specification. A key requirement of WebSocket Server-Sent Event emulation is the ability to transparently implement cross-origin communications. Such communications are conventionally precluded by the existing standards specified same-origin security policy requirements. That is, documents, particularly including web-pages delivered to a client system 32 from a source origin server 34, are constrained to referring to and requesting certain resources only within the same origin scope. As generally defined, an origin is defined by a transport protocol, domain, and port number. The origin access restriction precludes cross-site scripting attacks as well as more generally preventing inadvertent interaction between documents sourced from different origins. Unfortunately, the conventional origin security feature also blocks non-malicious communication between pages having different source origin scopes. Conventionally, a document served from, for example, a source origin server 34 is prevented from accessing or exchanging data with a document or service served from any target server 36, 38 that is in a different origin.

Figure 3:
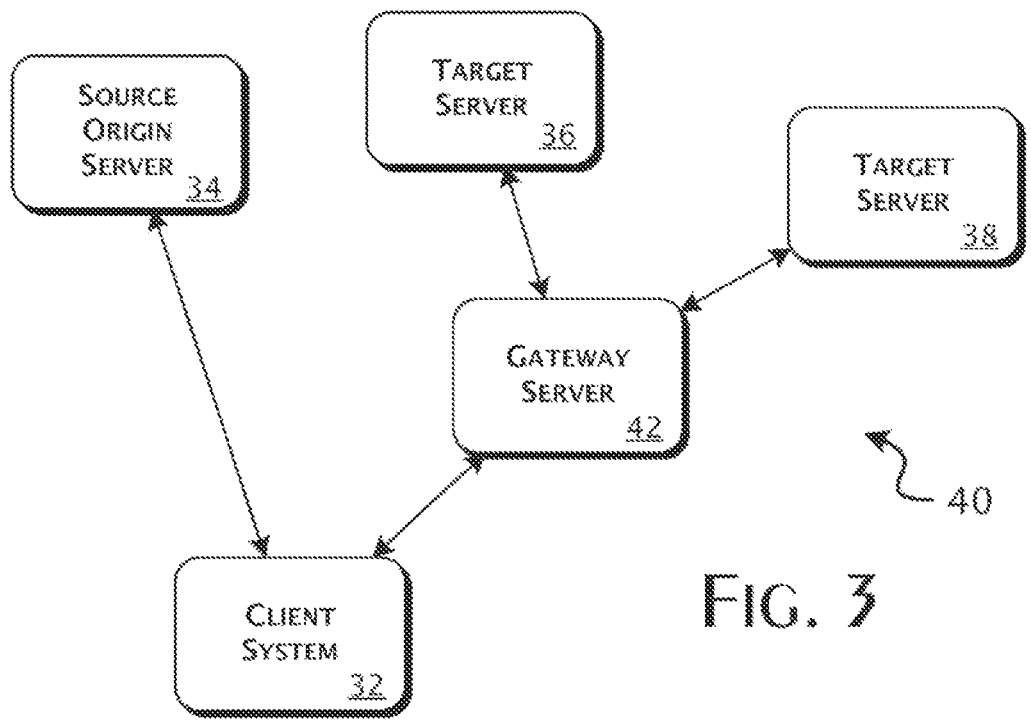
FIG. 3 is a block diagram illustrating a preferred client/server system appropriate for the implementation of a preferred embodiment of the present invention in implementing a distributed client/server Web application.

In accordance with the present invention, generally as shown in FIG. 3, a cross-document messaging system 40, constructed in accordance with the preferred embodiments of the present invention, selectively allows documents loaded by a client system 32 to securely interoperate across different origins. Target origin requests are defined, for purposes of the present discussion, as resource requests arising from a source origin document received from a source origin server 34 for documents or services provided by servers defined by an origin that is outside of the scope of that of the source origin server 34. If any of the specified domain, port, and transport protocols are different between source and target origins, the origin scopes differ and a request between those origins is a cross-origin request. In accordance with the present invention, target origin requests from the client system 32 are specifically directed to a gateway server 42 that, in turn, implements appropriate services to enable communications with target servers 36, 38. The gateway server 42 may and typically is in an origin that is outside of the scope of that of the source origin server 34 as well as that of the client system 32.

Figure 4:
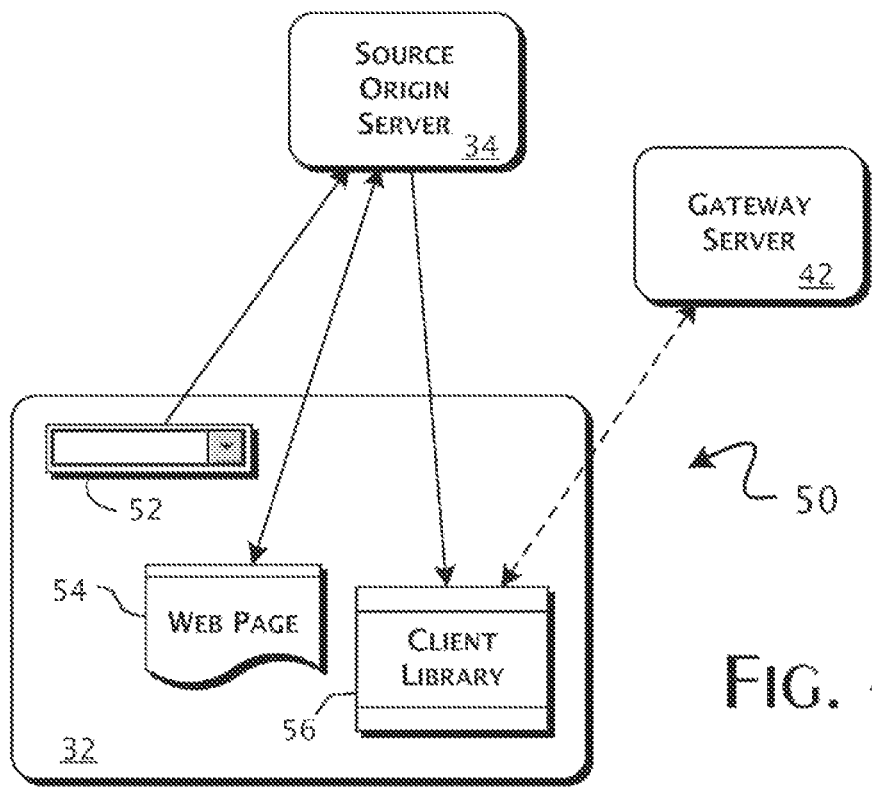
FIG. 4 provides a detailed block diagram illustrating a Web-browser client configured for implementing a client-side application in conjunction with a distributed client/server Web application consistent with a preferred embodiment of the present invention.

As represented in greater detail in system 50 of FIG. 4, a Web-browser client application 52, executed on the client system 32 issues a request to a user selected source origin Web-server 34. Upon evaluation, the source origin Web-server 34 returns a request corresponding to Web-page document 54. Preferably, the Web-page document 54 is pre-coded to include an identification of an initial configuration resource to be retrieved. When the Web-browser client application 52 encounters the object reference, the initial configuration resource request is issued to the source origin Web-server 34, returning a corresponding client library 56. Depending on the nature of the object referenced resource, one or more files may be returned as part of the client library 56. Preferably, the Web-page document 54 is also pre-coded with an initial target reference that serves to identify a designated gateway server 42 operating on behalf of the source origin Web-server 34.

Figure 5:
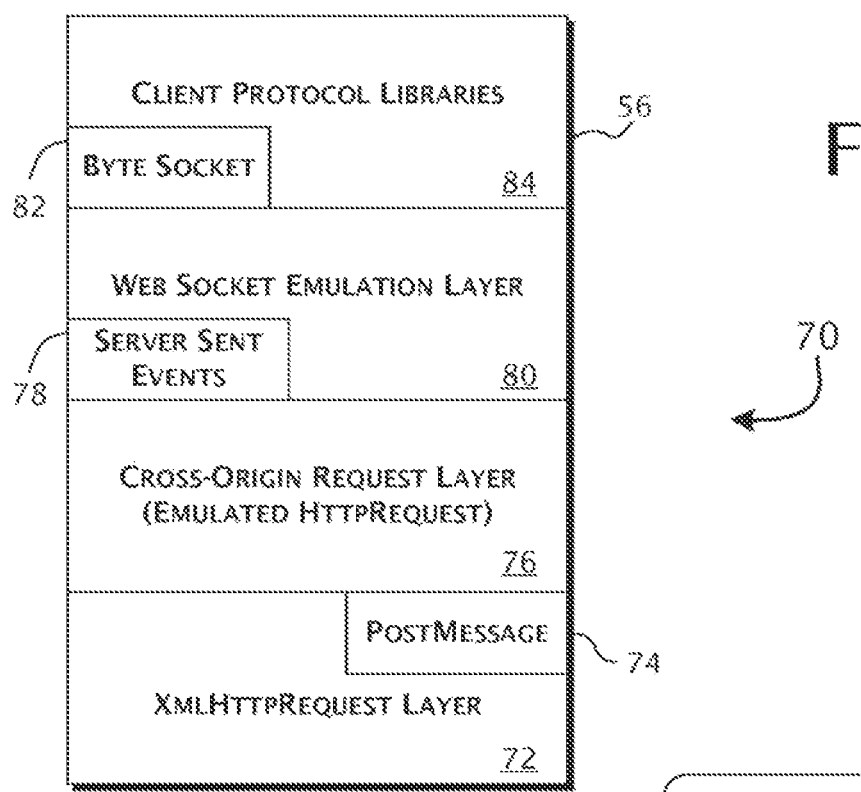
FIG. 5 is a block diagram of a client library implemented as a layered library stack consistent with a preferred embodiment of the present invention.

A preferred embodiment of the client library 56 is generally shown in FIG. 5 as a layered library stack 70. Collectively, the client library 56 provides for a functional HTML5 compliant WebSocket emulation when executed in a conventional pre-HTML5 compliant Web-browser application 52. Lower-level, more fundamental layers are located at the bottom of the layered library stack 70, with higher level functions being progressively provided in the upper layers. Additional layers, other than those shown in FIG. 5, exist in conventional pre-HTML5 compliant Web-browsers. Web-browser application layer plugins, including Adobe Flash, Microsoft Silverlight, and Oracle Java, may also be utilized if present within the Web-browser execution environment.

The base of the client library 56 is a conventional XmlHttpRequest (XHR) layer 72, nominally present without required emulation in pre-HTML5 compliant Web-browsers. The XmlHttpRequest layer 72 provides an application programming interface (API) that enables HTTP and HTTPS requests to be sent directly to a designated target Web-server system. The server response is received directly as data that is then available through the API for use by the Web-application that initiated the request. Nominally, the execution and completion of XmlHttpRequests are constrained to a single origin. That is, the request source and target Web-server systems must exist within the scope of a common origin.

A PostMessage layer 74 is provided to support emulated cross-origin messaging by providing additional API calls accessible to Web-applications executing within the context of the client browser 52. As implemented in the preferred embodiments of the present invention, the PostMessage layer 74 manages the strict security policy implementations of conventional Web-browsers, yet securely allows multiple frames defined by a single based Web-page document to communicate even where the documents embedded within those windows are loaded from different origins. Communication between the base document and documents embedded within the page is permitted through the PostMessage layer 74 provided the target explicitly expects and accepts messages from the named source origin. Bidirectional communication is supported where the source explicitly listens for and accepts messages from the named target origin. Some current conventional Web-browsers support an initial native implementation of the postMessage API. The PostMessage layer 74 preferably detects the existence and compliance of any existing postMessage API. In the absence of a native postMessage API or if the native postMessage API is non-compliant, the PostMessage layer 74 is enabled to handle, through emulation, all postMessage API calls.

In the preferred embodiments, the PostMessage layer 74 emulates the postMessage API utilizing an implementation dependent on the nature of the embedded window technology, typically being JavaScript, Flash and Silverlight. For each, an embedded document, or the equivalent, is retrieved within the scope of the embedded window origin. This embedded document functionally provides for bridge commutations processing compatible with the postMessage API. In the case of JavaScript, consistent with the currently preferred embodiments, emulation is implemented in a structured manner using client iframes as bridges to corresponding origins handled by the gateway server 42 and thereby functionally establish source to target communications paths. PostMessage messages are communicated through the iframes as short data segments transferred as URL id fragments, typically the post-"#" part of the iframe URL. Larger messages are split into multiple data segments for transfer. In the case of Java, Flash, and Silverlight, the installed runtimes, operated in combination with the window corresponding embedded documents, provide a basis for establishing communications using a technology-corresponding bridging mechanism as constructed in accordance with the present invention.

A Cross-Origin Request layer 76 provides an emulation of the W3C Cross-Origin Resource Sharing (CORS) specification accessible through an HTML5 compliant cross-origin resource sharing API. The Cross-Origin Request layer 76 is enabled where the Web-browser client either does not support native cross-origin resource sharing or the native implementation is not compliant. As implemented in a preferred embodiment of the present invention, cross-origin resource sharing is emulated in the Web-browser client 52 through leveraged use of the PostMessage layer 74 and XmlHttpRequest layer 72. Cross-origin resource requests are processed through the PostMessage and XmlHttpRequest layers 74, 72 and connected through the gateway server 42 to a specified target origin served by a corresponding target server 36, 38. In the preferred embodiments of the present invention, the gateway server 42 implements an HTML5 compliant cross-origin resource sharing component capable of establishing specification conformant connections to the target servers 36, 38.

A Server-Sent Events layer 78 allows Web-clients to connect to an HTML5 compliant Server-Sent Events stream. The Server-Sent events layer 78 locally manages a stream of data as sent from a remote target server to a Web-browser client 52. The server-sent stream of data is conventionally implemented as a unidirectional asynchronous series of network messages, transmitted downstream to the Web-browser client 52. Although some conventional Web-browsers have early native implementations of the SSE protocol, preferred embodiments of the present invention provide a complete implementation of the Server-Sent Events layer 78 by extending the agent-specific native implementation. That is, the Server-Sent Events layer 78 detects the current agent and supplements functionality as necessary to complete support for the SSE protocol. Where even partial native support is unavailable or unusable, the Server-Sent Events layer 78 performs a full emulation as appropriate to support the SSE protocol. In the preferred embodiments of the present invention, the gateway server 42 implements a program to manage a cross-origin XmlHttpRequest response streaming connection with the Web-browser client 52 to keep an HTTP response open while listening for additional messages sourced from an upstream target server operating at the source of a Server-Sent Events stream.

A WebSocket emulation layer 80 supports bi-directional connections. When established, the connections link a Web-browser client 52 directly with a back-end service, typically hosted on a target server 36, 38. Once established, the connection remains open and both the client and server can send information back and forth asynchronously. The WebSocket emulation layer 80 supports text-based protocols, such as Jabber, IMAP, and others. In the preferred embodiments, the WebSocket emulation layer 80 provides a full implementation of the HTML5 compliant WebSocket API.

A ByteSocket layer 82 is preferably provided to support binary data transmission through the WebSocket emulation layer 80. No corresponding binary transport protocol specification is provided by the W3C or IETF. In accordance with the present invention, the ByteSocket layer 82 implements an API that generally parallels the WebSocket API. The ByteSocket API provides additional methods to allow the reads and writes of binary primitives, including primarily byte values. The ByteSocket layer 82 enables implementation of the full range of binary protocols and, in addition, applies binary compression and encryption over the network for text-based protocols.

Additionally, typically specialized client protocol libraries may be included in the client library 56 as part of a client protocol library layer 84. These client protocol libraries will typically implement application or server specific protocols. In a preferred embodiment of the present invention, the client protocol library layer 84 can include an XmppClient client library that implements the conventional XMPP protocol used, for example, by Google Talk. Preferably, the XmppClient client library utilizes the WebSocket emulation layer 80 to exchange XMPP text-oriented messages.

The client protocol library layer 84 can also include a StompClient client library that implements Streaming Text Orientated Messaging Protocol (Stomp). Preferably, the StompClient client library utilizes the ByteSocket client library to exchange Stomp messages with remote servers executing Stomp-compliant applications, such as Apache ActiveMQ. Similarly, an IrcClient client library can be provided to support message exchange with remote Internet Relay Chat (IRC) servers. More specialized client libraries, such as a Remote Frame Buffer client library, can be implemented to support specialized bidirectional protocols. The Remote Frame Buffer protocol is utilized by Virtual Network Client (VNC) implementations to transmit keyboard and mouse events and receive graphical screen updates over a network.

In alternate embodiments of the present invention, during initialization of the emulation layers 70, a test is implemented to detect the potential presence of the Flash plugin within the execution context of the Web-browser client 52. If detected and suitably configured to allow use as an adjunct to emulation, the emulation layers 70 may selectively delegate certain networking and socket communications operations to the plugin, sufficient to establish single TCP socket connections with a designated gateway server 42. That is, while a Flash plugin is generally used to support UI operations, selective advantage can be taken of the limited networking layer and limited socket capability built into the plugin. By utilizing only network and socket layer aspects, no visible display artifacts are created. The Flash plugin is, however, not always available, configured in a usable manner, or usable due to the existence of firewalls, HTTP Proxies, and other communications barriers. Use of the networking layer provided by the Flash plugin may still be made under limited circumstances.

In typical use, Web applications are implemented as a combination of a client-side application executed by a Web-browser client 52 and a distributed server-side application functionally implemented in some combination by the source origin server 34 and one or more target servers 36, 38. Object references in the Web-page 54 enable the Web-browser client 52 to initially load the client-side application as one or more documents. The client-side application will be typically designed to interact with and use the APIs associated with the Server-Sent Event layer 78, WebSocket emulation layer 80, and byte socket layer 82. While the WebSocket emulation layer 80 is expected to be the predominant API used, all of the layers are available for use by a client side application.

Figure 6:
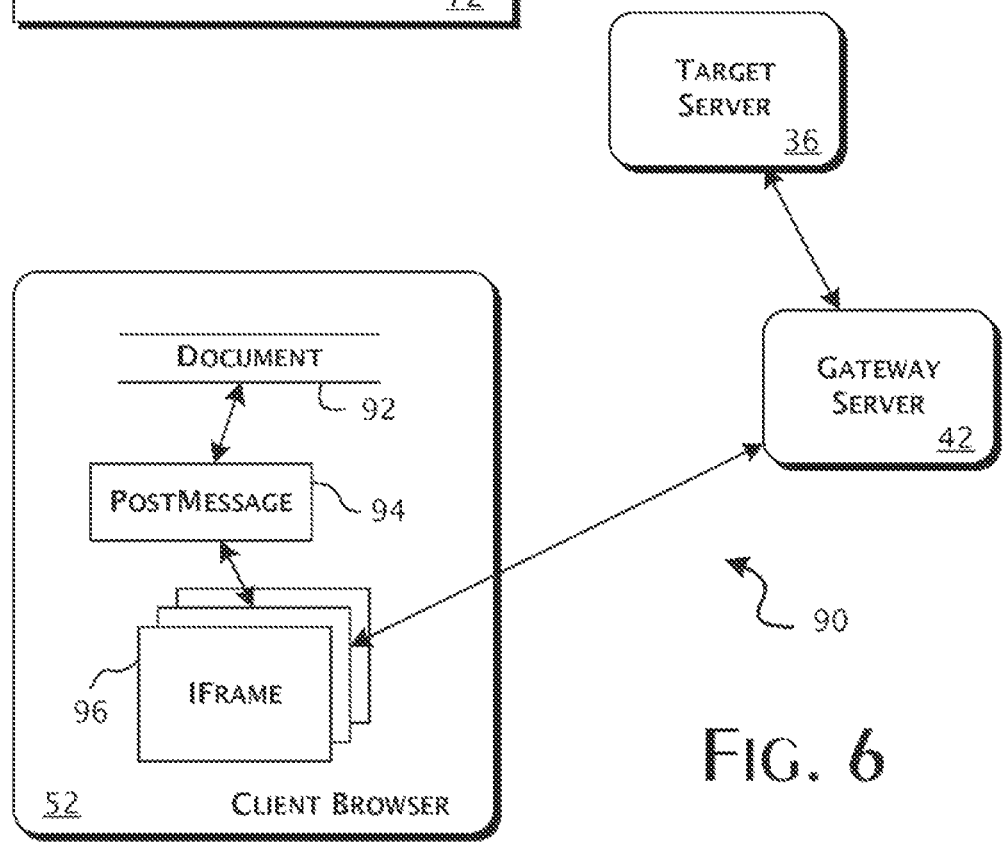
FIG. 6 is a block diagram detail illustrating a preferred iframe-based implementation of a Web-browser client application in accordance with a preferred embodiment of the present invention.

Referring to FIG. 6, a client side application is represented as an executable document 92 within the context of the Web-browser client 52. As implemented in the preferred embodiments of the present invention, API calls to the client library 56 due to the fact that execution of the document 92 will ultimately be realized as a postMessage request 94. Each postMessage request 94, at a minimum, is defined by relevant source and target origins and an operation represented by the request. The source origin is that of the document 92. By the nature of the emulation implemented, the target origin for the message is effectively that of the gateway server 42. Multiple gateway servers 42 may be concurrently implemented for load balancing and relative geographical reasons. In practice, a postMessage request 94 will also identify a target gateway server 42.

Where the client side application implementing technology is JavaScript, one or more iframes 96 are established as a communications bridge. Each cross-origin XmlHttpRequest processed through the cross-origin request layer 76 will be realized as a corresponding postMessage request 94 that is, in turn, preferably passed as a document event to an iframe 96 instance. The iframe 96 instance is selected based on the unique combination of source and target origins associated with the request, where the target origin again corresponds to the origin of a servicing gateway server 42. In the preferred embodiments of the present invention, iframe 96 instances are created as needed and persist preferably until either the Web-page 54 or the Web-browser client 52 is closed. Where an iframe for a combination of source and target origins has not yet been created, the PostMessage layer 74 creates a corresponding iframe 96 and, through a pre-flight request/response transaction with the gateway server 42, a trust relation is established through the iframe 96 instance.

From the perspective of the gateway server 42, the occurrence of the pre-flight request is consistent with a standard CORS pre-flight request, thereby permitting CORS compliant Web-browsers to interoperate with the gateway server 42. As part of establishing the trust relation, a communications bridge routine is downloaded from the gateway server 42 into the iframe 96 instance to implement the target side of the postMessage API within the iframe 96 instance. By virtue of the trust relation, an XmlHttpRequest corresponding to the initiating postMessage request can then be transmitted to the gateway server 42 and forwarded, as appropriate, to a servicing server, such as the target server 36. In the preferred embodiments of the present invention, a mapping is administratively established on the gateway server 42 to define services provided by other target servers 36, 38 accessible through the gateway server 42. Thus, where a postMessage request represents a WebSocket request, a typical result is the establishment of a bidirectional capable connection between the document 92, through the corresponding iframe 96 instance, to the gateway server 42 to a remote service, typically as provided by the target server 36, operating as a real-time, asynchronous source of data to the document 92.

Verification of the source origin is preferably performed by the gateway server 42. In the JavaScript emulation environment, the gateway server 42 verifies that each received request includes an XmlHttpRequest "Referer" header having a value that matches the target origin of gateway server 42, and an XmlHttpRequest "X-Origin" header having a value of a permitted source origin. Preferably, the value of the "X-Origin" header is determined by the communications bridge routine downloaded from the gateway server 42 into the iframe 96 instance. Since the gateway server 42 originates the communications bridge routine and the communications bridge routine determines the source origin of the document 92 containing the iframe 96 instance from the Web-browser client 52, the value of the "X-Origin" header can then be trusted by the gateway server 42 to accurately identify the source origin of the request.

For other client side application implementing technologies, such as Flash and Silverlight, a similar emulation architecture is used. In general, the postMessage request 94, dependent on the technology identified, will create a corresponding sub-window, similar to an iframe 96, within the base document 92. Initialization of the window will result in a document or equivalent to be referenced and retrieved from the gateway server 42 as part of or equivalent to a pre-flight request/response transaction. The retrieved document, in the preferred embodiments of the present invention, functionally includes a communications bridge routine that implements the target side of the postMessage API, thereby allowing, as needed, a secure communications path between the base document 92 and sub-window document.

A preferred process 110 of establishing a trust relationship with a gateway server 42 is generally shown in FIG. 7. In response to a conventional page request 112, typically initiated by a user of the Web-browser client 52, a load page request is issued to an origin server 34, as identified by the request 112. The corresponding page is loaded 114 and initially evaluated 116 to locate and load any additional objects required by the page. In the preferred embodiments of the present invention, a page embedded reference to the client library 56 results in an essentially static resource load 118 from the embedded reference identified gateway server 42. The Web-browser client 52 completes initializations 120 related to the page loaded, including any requisite initialization of the client library to detect and establish emulation intercepts into the Web-browser client for client library layers 70.

In response to an initiating event, typically resulting from some user interaction 122 or autonomous operation of the document 92, a WebSocket, byte socket, cross origin request, or other request is made against the client library layers 70. For purposes of example, the request is a WebSocket request that originates from a JavaScript client application represented by the document 92. The request is further specified as requesting connection to a particular service provided by the gateway server 42. The request is processed 124 into the PostMessage layer 74. In accordance with the preferred embodiments of the present invention, where an appropriate iframe 96 instance does not yet exist, an iframe is created with a functional source origin identifying the source origin of the Web-page base document 54 and a functional target origin identifying the effective location of the service. Creation of an iframe in JavaScript may be implemented, for example, with the following code:

ifrm=document.createElement("iframe");
ifrm.setAttribute("src", "http://gateway.com:2750/stockService");
document.body.appendChild(ifrm);

The functional source origin of the iframe is not explicitly set but is automatically determined by a call by the communications bridge routine to the Web-browser client 52. This call is preferably made during the initialization of the communications bridge routine following the creation of the iframe 96 instance and download of the communications bridge routine into the iframe 96 instance. The functional source origin of an iframe 96 instance is thus determined as the source origin of the document 92, for example "http://retailer.com:80", responsible for the creation of the iframe 96 instance. The functional target origin is specified explicitly using the "src" attribute as, for example, "http://gateway.com:2750".

A pre-flight XmlHttpRequest message, preferably identifying the relevant source and target origins of the initiating postMessage request, as well as the requested service, is then sent 126 to the designated gateway server 42. An administratively established service access policy on the gateway server 42 is evaluated against the request. In a preferred embodiment of the present invention, the policy is generally of the form:

<service>
<accept>ws://gateway.com:2750/stockService</accept>
<connect>tcp://target.com:1330</connect>
<type>proxy</type>
<cross-site-constraint>
<allow-origin>http://retailer.com:80</allow-origin>
</cross-site-constraint>
</service>

Thus, the specific cross-origin resource request from "http://retailer.com:80" to "ws://gateway.com:2750" for a service "/gwStockService" is determined acceptable. The request will be further supported by creation on demand by the gateway server 42 with the establishment of a TCP-based WebSocket connection to an actual service source "tcp://target.com:1330/stockService" provided, by way of example, by a remote target server 36. In the preferred embodiments of the present invention, various services requestable by Web-browser client applications 92 may be hosted directly on the gateway server 42. The connection specified by the service access policy is, in such cases, a connection reference to localhost.

Dependent on the evaluation of the service access policy, an acknowledgment message is returned 128. If the service connection is not permitted for any reason, the originating request 124 essentially fails. Where permitted, the necessary emulated support for a WebSocket connection is initialized 130. In the preferred embodiments of the present invention, this includes installing within the iframe 96 instance a postMessage listener to handle incoming request events, generally as shown in the following JavaScript example:

var xhr;
window.onmessage=function(event) {
// Create an XMLHttpRequest on the first outgoing transmission
if (!xhr) {
xhr=new XMLHttpRequest( );
// when downstream messages arrive,
// post them to the parent window
xhr.onprogress=function(event) {
// process the incoming event and send it to the parent
document window.postMessage(xhr.responseText, bridgeOrigin);}}
// if necessary send a pre-flight request
// . . .
// gateway.com:2750 is the URL of the Gateway in the target origin
xhr.open(method, http://gateway.com:2750, true);
// then, send the data contained in the postMessage
xhr.send(event.data)}

The postMessage request corresponding to the WebSocket request 124 is then functionally converted to an XmlHttpRequest. Specifically, the HTML5 compliant postMessage request is called on a window, representing a target document, within a base Web-page 54 document. The request passes a message, represented as postMessage data, and the source origin of the request. Where an iframe 96 instance has been previously established, the postMessage request is passed through the PostMessage 74 API.

The request is then transmitted to the gateway server 42 and qualified based on service access policy. The gateway server 42, in turn, establishes a corresponding connection 134 with the identified target server 36. The nature of the connection 134 depends on the nature of the requested service, and may be, for example, a TCP or WebSocket connection. The response to the XmlHttpRequest is received and passed back through the iframe chain to return the responsive data payload to the base Web-page 54 document. Subsequent WebSocket requests 124 reuse the iframe 96 instance, thereby making leveraged use of the established trust relationship between the source and target origins.

Figure 8A:
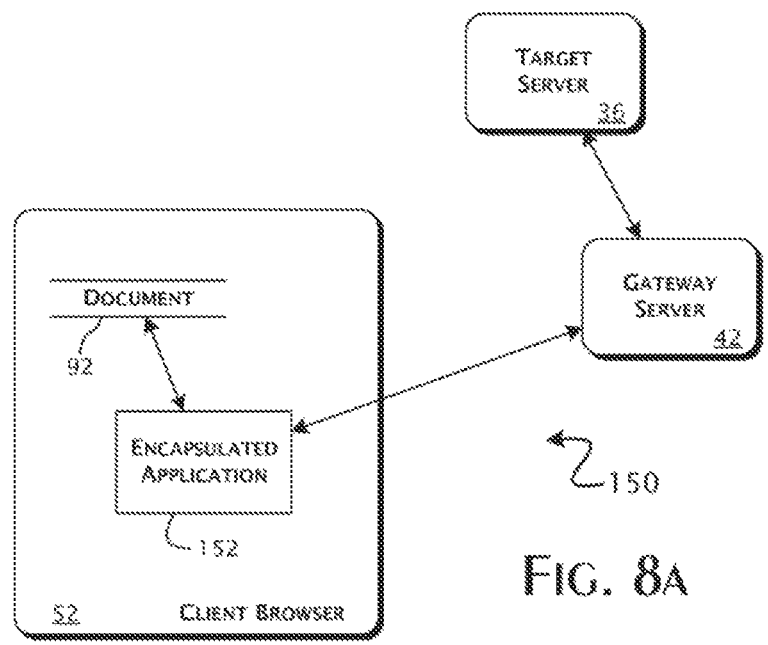
FIGS. 8A and 8B are block diagrams illustrating preferred encapsulated implementations of a Web-browser client application as constructed in accordance with a preferred embodiment of the present invention.

In regard to other Web-browser client application 92 technologies, interactions with the Web-browser base page 54 may be limited. As generally shown in FIG. 8A, the Web-browser base page 54 may embed an encapsulated Flash, Silverlight, or other application 152 with limited, if any, requisite interaction with another Web-browser client application 92 embedded in the base page 54. In the preferred embodiments of the present invention, such encapsulated applications 152 may be loaded as resources 118 from the gateway server 42.

In the case of a Flash encapsulated application 152, the Flash runtime library provided as part of the Flash plugin includes a generally proprietary network and socket-like communications capability. The client library 56 is preferably included as part of the encapsulated application 152, allowing the encapsulated application 152 to communicate directly with the gateway server 42 external services. Such communications are same-origin.

Figure 8B:
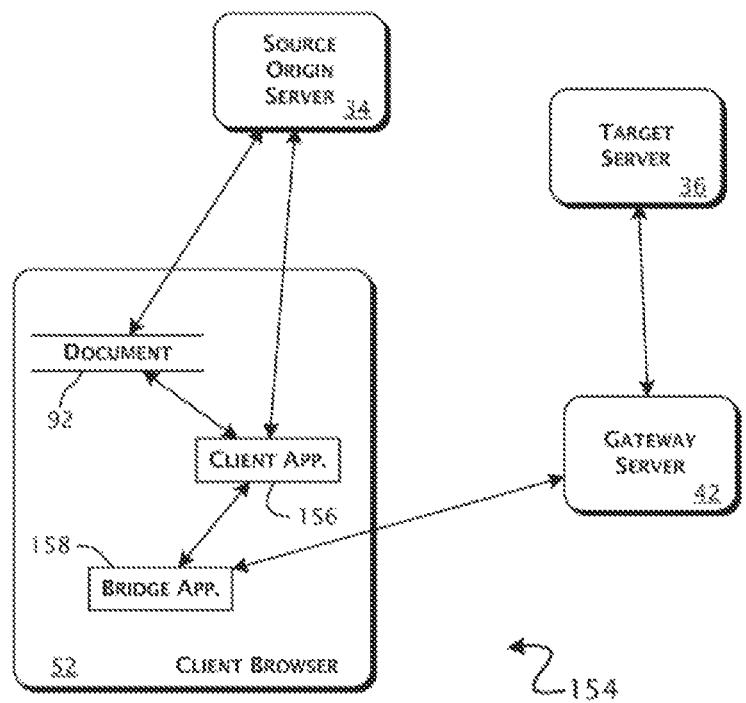

The preferred Flash embodiments of the present invention provide support for Flash application execution with cross-origin resource sharing. Referring to FIG. 8B, the document 92 loaded from the source origin server 34 includes a reference to a Flash client application 156 also loaded from the source origin server 34. The Flash client application 156, as executed by the Web-browser client 52, therefore executes within the source origin of the document 92 and source origin server 34. The Flash client application 156, in turn, includes a reference to a Flash bridge application 158, further specified to be loaded from the gateway server 42. The Flash bridge application 158 therefore executes within the target origin of the gateway server 42.

The Flash client and bridge applications 156, 158 are preferably implemented as Flash movie files loaded as SWF file format documents. The Flash client application 156 preferably includes the client library 56. In accordance with the present invention, a secure communications capability is established between the Flash client and bridge applications 156, 158 as an analogue of the postMessage communications through iframes. Preferably, this channel is established using shared events, as supported through the Flash runtime library, thereby allowing data to be dispatched bidirectionally. This communications channel is secured to a unique combination of source and target origins by requiring the Flash bridge application 158, through execution, to verify and only communicate with a Flash client application 156 identified with a source origin qualified by the gateway server 42. In initialization of the communications channel, the source origin of the Flash client application 156 is retrieved by the Flash bridge application 158 from the LoaderInfo metadata of the Flash client application 156. This source origin is returned to the gateway server 42. Provided the origin is allowed, on evaluation of an administratively established security policy local to the gateway server 42, the Flash bridge application 158 is, by return message, enabled for shared event communications with the Flash client application 156. Once enabled, the client-side Web-application implemented by the Flash client application 156 can access cross-origin the gateway server 42 as needed to access remote services provided by, for example, target server 36.

Alternately, the Flash client application 156 can communicate directly with the gateway server 42 using a WebSocket connection. If a native WebSocket connection is desired, the Flash bridge application attempts to issue a WebSocket request to the target gateway server 42. Rather than communicating through a Flash bridge application 158, initial execution of the Flash client application 156 issues a WebSocket connection request through the client library 56 as provided as part of the Flash client application 156. This connection request is emulated using the Flash runtime to request a socket-based connection with the gateway server 42. A Flash cross-domain policy file is then retrieved from the target origin of the intended WebSocket connection. The gateway server 42 is preferably configured to specifically listen for such request and return a valid Flash cross domain policy file. The Flash runtime underlying the Flash client application 156 evaluates the policy and determines whether a cross-origin WebSocket connection with the target origin is permitted.

An example cross-domain policy file is as follows:
<cross-domain-policy>
<allow-access-from domain="retailer.com:80" to-ports="2750"/>
</cross-domain-policy>

Provided the Flash runtime receives a compliant policy file and the from-domain matches the source origin of the Flash client application 156, the runtime allows the client library to open a socket to the target origin on the specified port and communicate via the native WebSocket protocol. As part of the WebSocket protocol handshake, cookies for the target origin are also required to be sent. However, the native socket connections do not transmit cookies by default, so a minimal HTTP request is also sent to the target gateway in order to discover any cookies attached to the target domain. The cookies are parsed from the HTTP response and included in WebSocket handshake communications.

The implementation of cross-origin communication in desktop and applet Java clients preferably employs a similar client application 156 and bridge application 158 architecture. For a Java client application 156, the application code is loaded in a .jar file, preferably including a Java implementation of the client library 56, from the source origin server 34. The Java client application 156 is thus in the source origin of the document 92. On initial execution, the Java client application 156 will make a request to load the bridge application 158, also provided as a .jar file, from the gateway server 42. The load of the bridge application 158 is permitted. Execution is in the target origin.

The Java client runtime includes a sockets and HTTP request library implementation. If native WebSocket protocol connection is desired, the bridge application 158 can make a socket connection to the gateway server 42. If emulated WebSocket protocol is instead necessary, for example, as required to traverse intervening proxy servers, the runtime HTTP request library is used.

To segregate code from different origins from interacting in an insecure manner, the Java runtime loads classes from different origins in different "class loaders." By default, code loaded in one class loader cannot access or execute code loaded in another class loader. However, code that is core to the runtime system is loaded in a special "runtime class loader" which can be safely accessed by any other code. To create a communications channel between the Java client and bridge applications, as a postMessage analogue, code in the client library 56, within the client and bridge .jars both instantiate an interface or extendable class existing as part of the core Java runtime. This class, being loaded on the runtime class loader, is accessible to both the Java client application 156 and the Java bridge application 158. An example class that could be used for this purpose is the standard Java class "java.beans.PropertyChangeSupport." This class is available in the Java runtime in all execution environments and, as such, can be called by the Java client application 156 and the Java bridge application 158 without incurring a security exception. The PropertyChangeSupport class and other such classes are sufficiently generic to allow extension or implementation that permits arbitrary data to be passed in both directions.

As is also required in other client runtime environments, the reported source origin of any target communications must be accurate and protected from tampering. In order to guarantee accuracy, the Java bridge application 158 implements a call to the Java runtime environment to determine the source origin of the Java client application 156. Specifically, the Java bridge application 158 makes a call to load a .class file known to exist within the .jar file of the Java client application 156. Where, for example, this .class file is named "SourceOriginLocation.class," the Java bridge application 158 makes the following call to load the class:

URL url=getClassLoader( ).getResource("SourceOriginLocation.class");

The returned URL value will include an identification of the origin of the loaded .class file and therefore, the source origin. For example, if the name of the Java client application 156 .jar file is "client.jar," the returned URL would be of the form:

jar:http://retailer.com:80/client.jar!/SourceOriginLocation.class where "http://retailer.com:80" is therefore the source origin of the Java client application 156. This source origin is then delivered to the gateway server 42 during any connection, allowing the gateway server 42 to validate and selectively permit cross-origin connections from this source origin. As the Java client runtime can itself be trusted to return the correct resource string during class loading, the source origin value can also be trusted.

Figure 9:
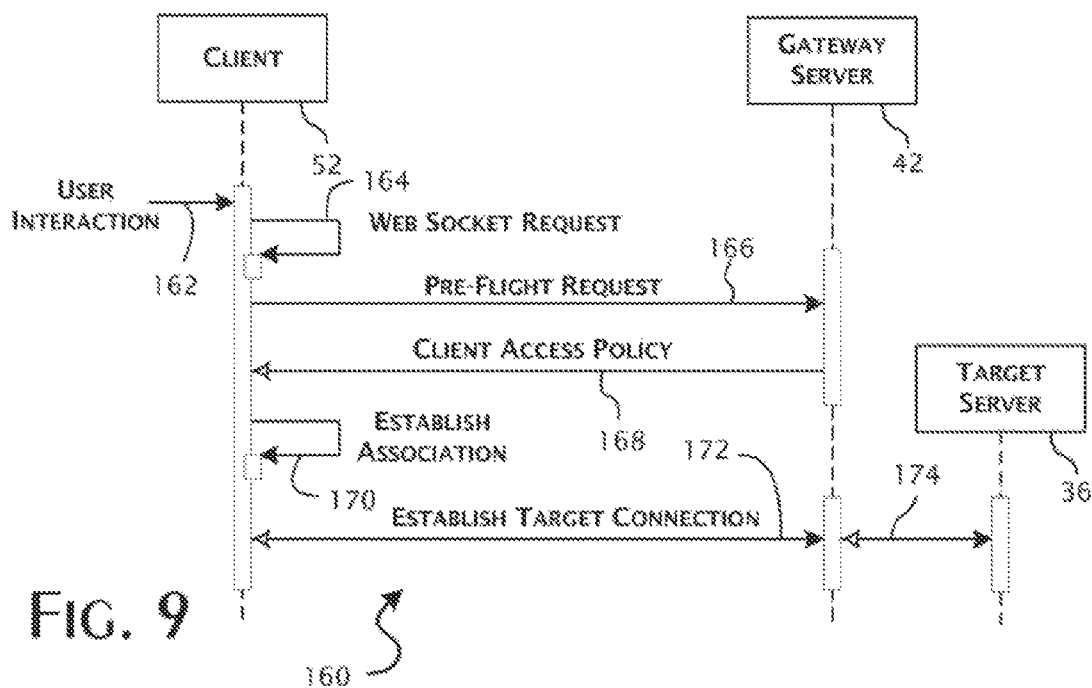
FIG. 9 is a sequence diagram illustrating the execution of a Web-browser client encapsulated application in establishing an emulated WebSocket network connection in accordance with a preferred embodiment of the present invention.

A limitation exists in the case of a Silverlight encapsulated application 152 that is addressed in preferred embodiments of the present invention. In summary, origin security scope supported by the Silverlight runtime provides an inadequate specificity for practical use in conjunction with widely distributed Web applications. This limitation is managed in preferred embodiments of the present invention by the qualifying of the cross-origins communications policy during the setup of the encapsulated application 152. Referring to FIG. 9, in response typically to some user interaction 162, the encapsulated Silverlight application 152 will process a Silverlight service request, represented as a WebSocket request 164, through the client library 56. As implemented in the preferred embodiments of the present invention, two headers will be automatically added to the WebSocket request 164. In the preferred embodiments of the present invention, the headers are specified as:

X-Origin: http://retailer.com:80
X-Origin-http%3A%2F%2Fretailer%3A80: http://retailer.com:80 where the first header identifies the effective source origin and the second is a dynamically generated header that encodes the source origin. In processing the WebSocket request 164 directed to the gateway server 42, the Silverlight runtime will recognize the cross-origin communications attempt. The Silverlight runtime will then initiate a pre-flight request 166 to retrieve a client access policy. The pre-flight request, by convention, is directed to the origin root to retrieve the specifically named "clientaccesspolicy.xml" document. Thus, where the defined target origin is http://gateway.com:2750, the document request is directed to http://gateway.com:2750/clientaccesspolicy.xml. The gateway server 42, in expectation of Silverlight access, listens for such requests and responds with a customized client access policy 168, subject to the gateway server 42 having a service access policy that permits cross-origin access. In other words, the source origin of the request is checked against the <cross-site-constraint> entries of the service access policy. Where the constraint is met, a clientaccesspolicy.xml document is dynamically generated and returned 168. The client access policy will be generally of the form:

<?xml version="1.0" encoding="utf-8"?>
<access-policy>
<cross-domain-access>
<policy>
<allow-from http-request-headers="X-Origin, X-Origin-http%3A%2F%2Fretailer.com%3A80">
<domain uri="http://retailer.com"/>
</allow-from>
<grant-to>
<resource path="/myService" include-subpaths="true"/>
</grant-to>
</policy>
</cross-domain-access>
</access-policy> specifying that valid requests from the domain http://retailer.com to the path /myService, including subpaths, are allowed to include the two header values X-Origin and X-Origin-http%3A%2F%2Fretailer.com%3A80. This client access policy is registered with the Silverlight runtime with reference to the Silverlight encapsulated application 152. Consequently, in accordance with the present invention, the Silverlight encapsulated application 152 will provide the headers as part of all Silverlight requests and the gateway server 42 will only accept Silverlight requests that have both headers. The dynamic generation and application of the client access policy as part of the pre-flight transaction 166, 168, qualifies the operation of the Silverlight runtime to, in turn, permit and pass such requests. The Silverlight runtime will continue to block requests having non-conforming headers. The gateway server 42 will disallow any Silverlight requests without conforming headers.

Figure 10:
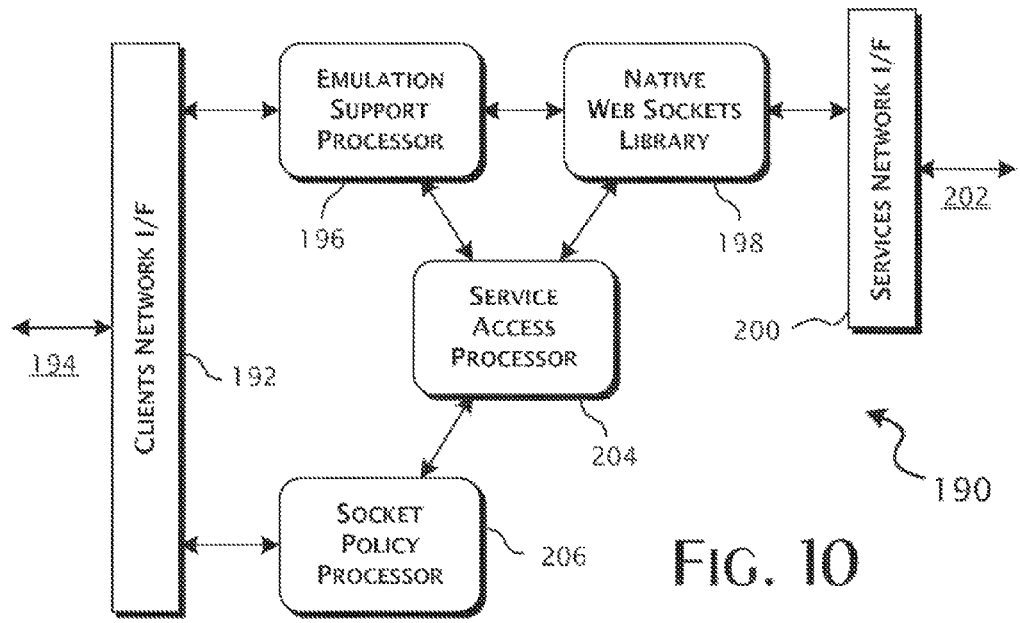
FIG. 10 is a block diagram of a preferred implementation of a gateway server as implemented in a preferred embodiment of the present invention.

Referring to FIG. 10, a preferred implementation 190 of a gateway server 42 is shown. In the preferred embodiments, the gateway server 42 is implemented on a conventional Web server system configured to support network connections to Web-browser clients 32 and various origin servers 34, 36, 38. Functionally, a client network interface 192 supports network connections 194 with Web-browser clients 32. Requests, originating from client libraries 56, are directed to an emulation support processor 196, preferably implemented as an even driven module hosted within an application server executed by the gateway server 42. Initially processed requests are then implemented through a native WebSockets library 198 that is capable of establishing TCP and other network connections 202 through a services network interface 200 to remote origin servers 36, 38 providing requested WebSocket compatible services.

A service access processor 204, also executing as an event driven module within the application server hosted by the gateway server 42, evaluates and qualifies requests received by the emulation support processor 196. Client access requests issued during Flash and Silverlight pre-flight operations are received and handled by a socket policy processor

206. The service access processor 204 is accessed by the socket policy processor 206, as needed to qualify the origins identified in Flash and Silverlight pre-flight requests.

The gateway server 42, specifically the emulation support processor 196, preferably supports redirection of service requests. The service access processor 204, in addition to qualifying service requests, may specify a service target redirection. Nominally, such a redirection would be implemented by the return of a conventional HTTP 30X response to a service request. Embodiments of the present invention utilizing iframe 96 instances for WebSocket communications with the gateway server 42, however, are limited in the handling of such redirection requests. Specifically, an iframe 96 instance cannot handle a redirection to an origin outside of the scope of the target origin established during the creation of the iframe 96 instance. Other technologies used in implementing the encapsulated program 152 may be similarly limited in automatically handling redirection requests.

Figure 11:
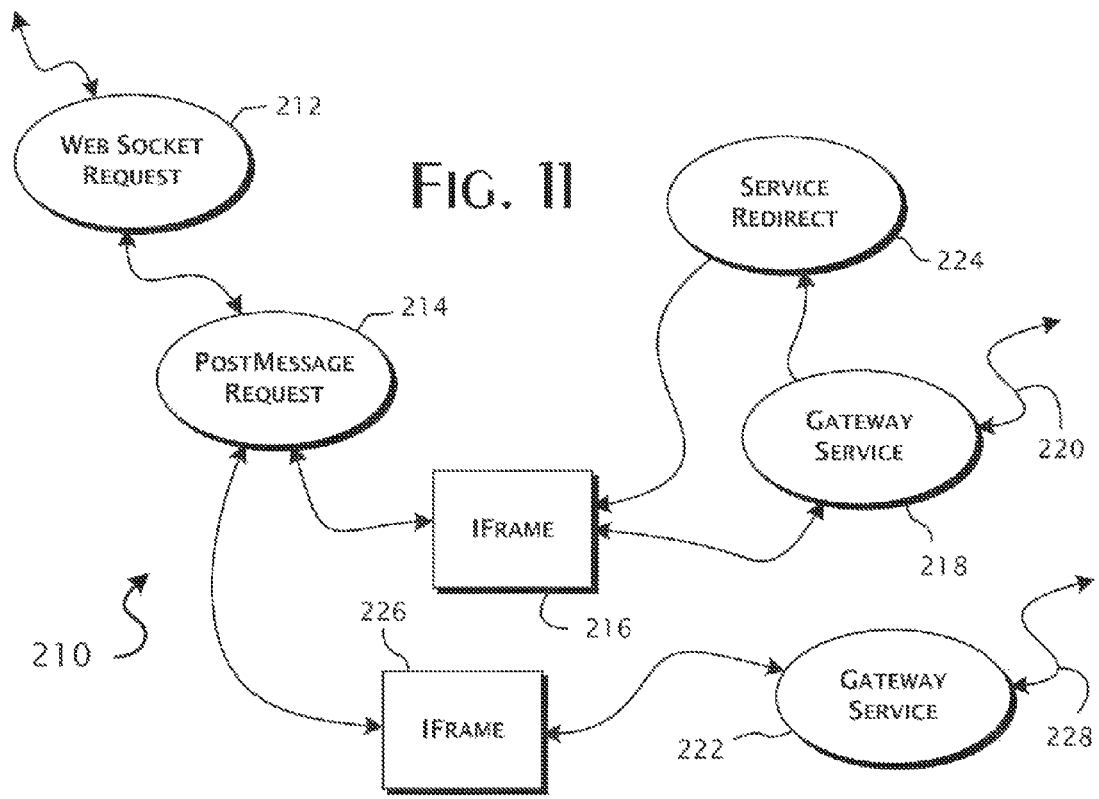
FIG. 11 is a flow diagram illustrating a preferred service redirection technique used in conjunction with a preferred embodiment of the present invention.

In affected preferred embodiments, an alternate redirection processing flow 210, as shown in FIG. 11, is preferably used. For clarity, the redirection processing flow 210 is described specific to the Javascript implementation. As previously described, a WebSocket request 212 is processed as a post-Message request 214 through the PostMessage layer 74 of the client library 56 and a corresponding iframe 96 instance 216. A gateway request 218 for the corresponding service is made to a gateway server 42. Nominally, the request is handled by connection 220 to the requested service on a remote target server 36, 38.

The gateway server 42 instance 218 may instead determine that a redirection to a different gateway server 42 instance 222 is appropriate. This determination is made based on an evaluation of the local, administratively established service access policy and preferably identifies the redirection target gateway server 42 instance 222. The redirection is preferably implemented by the creation of a service redirect 224 message returned to the iframe 216. The service redirect 224 message is specifically provided as an HTTP 20X message wrapping an HTTP 30X redirection message. While the iframe 216 might fail to handle an explicit HTTP 30X message, if the redirection is cross-origin, the iframe 216 is able to receive an HTTP 20X message and return the contained payload data as a compliant response to the originating postMessage request 214. The PostMessage layer 74 further returns the message payload to the WebSocket emulation layer 80 for evaluation. In the specific case of a returned message payload corresponding to an HTTP 30X redirection, the WebSocket emulation layer 80 emulates the redirection directive by reissuing the postMessage request 214 to the redirection target gateway server 42 instance 222, as specified by the HTTP 30X redirection message. An iframe 96 instance 226, corresponding to the target origin of the gateway server 42 instance 222, is utilized. Provided the gateway server 42 instance 222 does not perform a further redirection, a connection 228 is made to the request identified service on a remote target server 36, 38.

A generally equivalent redirection processing flow 210 is implemented for other implementing technologies, such as Java, Flash and Silverlight. Where applicable in these cases, the bridge application 158 instances are limited to defined target origins, thus precluding an immediate handling of a redirection request. A wrapped HTTP 30X redirection message is again preferably provided 224 to the bridge application 158 instance, allowing the content to be returned to the client application 156 and handled by the WebSocket emulation layer 80 within the client application 156.

As should be evident, any other response messages that would be problematic to be handled immediately in an iframe 96 or bridge application 158 instance can be handled in a manner similar to the redirection processing flow 210. That is, any such problematic response may be wrapped in an HTTP 200 response message, enabling the enclosed response message to be handled by the document 92 or client application 156.

Figure 12:
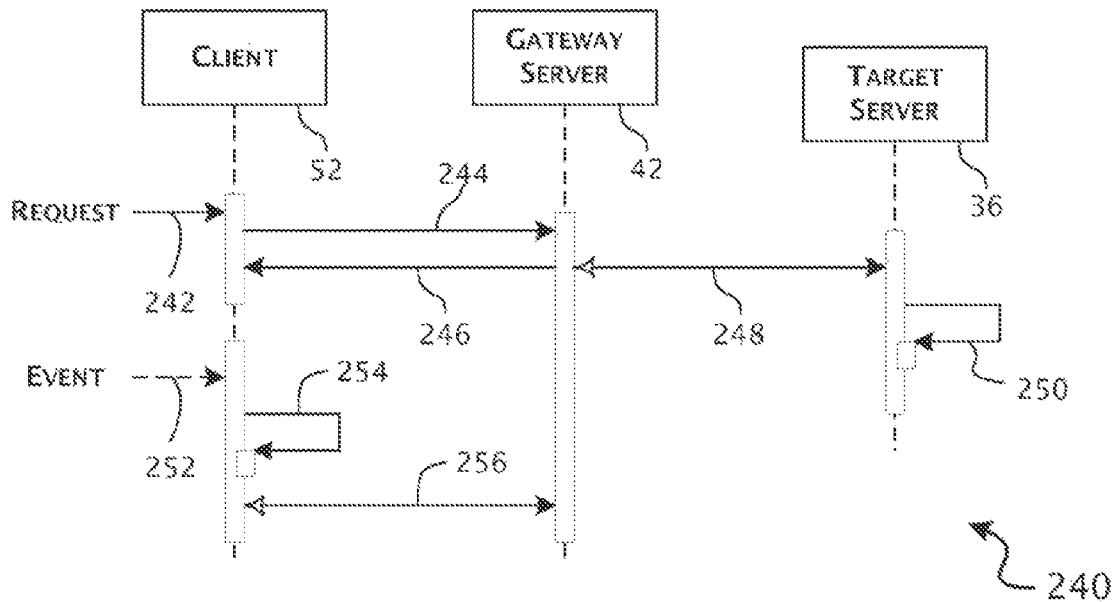
FIG. 12 provides a sequence diagram showing the preferred process of establishing emulated WebSocket connections between a Web-browser client and a gateway server in accordance with a preferred embodiment of the present invention.

The preferred 240 process of establishing an emulated WebSocket connection between a Web-browser client 52 and gateway server 42 is shown in FIG. 12. In response to a client-side WebSocket emulation, or similar, request 242 against a client library 56, an HTTP connection 244 is initially made to the gateway server 42. The connection 244 is not closed by the gateway server 42, but rather maintained open 246 and used for the transmission of data downstream from the gateway server 42 to the Web client browser 52 in effective emulation of one half of a bidirectional WebSockets communications session. The service request provided through the connection 244 is preferably used by the gateway server 42 to establish a conventional bi-directional, TCP-based, WebSocket connection 248 with an appropriate remote target server 36 identified as effectively hosting the requested service. Once the connection 248 is established, the corresponding service 250 may select and send data as an asynchronous series of Server-Sent Events relayed over the open connection 246.

Preferably, upstream communications, occurring in response to some user event 252 or based on the autonomous execution of the client side Web application 254, are sent on a separate HTTP connection 256 as a cross-origin resource request transmitted as an XmlHttpRequest to the gateway server 42. Preferably, the request is sent in emulation using the Server-Sent Events message syntax. This preference is largely for consistency in handling the bidirectional communications and, further, permits reliable message delivery through the WebSocket based on the reliable delivery message mechanism of the Server-Sent Event layer 78. That is, in the preferred embodiments, the emulated server sent message syntax includes event IDs that are tracked for receipt acknowledgment. Server-Sent Event messages are preferably buffered until a corresponding acknowledgment message has been received, thereby allowing retransmission in the circumstance, or apparent circumstance, of a message delivery failure. Upstream messages received through the connection 256 are routed by the gateway server 42 through the bidirectional WebSocket connection 248 for consideration and appropriate response by the service 250.

Upstream communications are typically limited in number and tend to be short messages. This, in combination with the concurrent connection limit implemented in conventional Web-browser clients, results in a preference for using transient upstream connections from the Web-browser client to the gateway server 42. Under emulation, preferably only the downstream connection 246 is maintained as a persistent communications connection.

Figure 13:
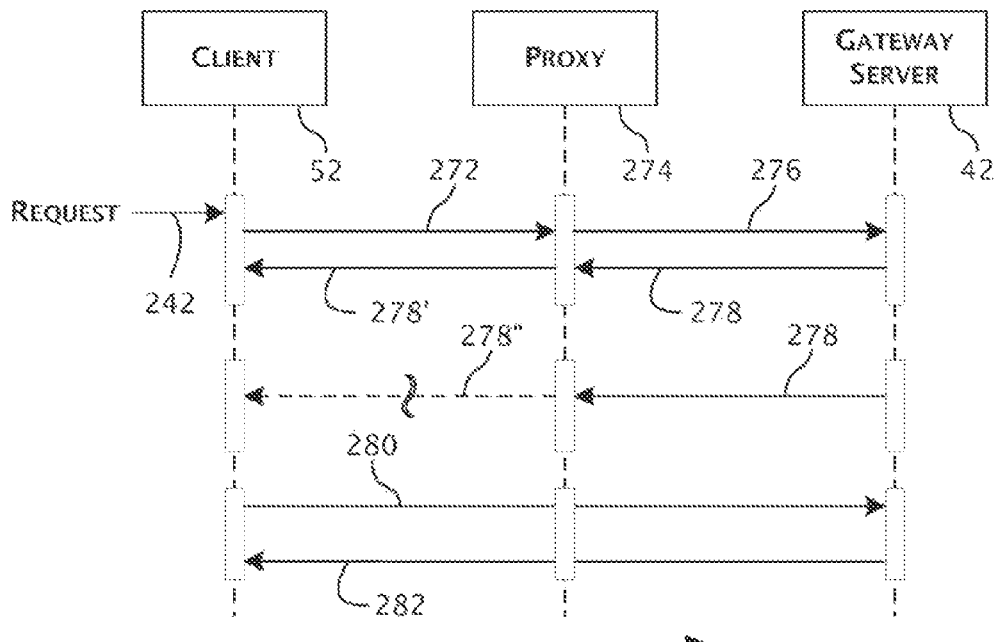
FIG. 13 provides a sequence diagram illustrating the handling of proxy server involvement in the establishment and maintenance of emulated WebSocket connections between a Web-browser client and a gateway server in accordance with a preferred embodiment of the present invention.

By the nature of a conventional, native WebSocket connection, the presence of proxy and other relay servers may be tolerated in the path of a WebSocket connection. In the preferred embodiments of the present invention, the WebSocket emulation layer 80, in combination with the gateway server 42, preferably implements functional monitoring of the state of the downstream connection 246 in order to detect the presence or problematic behavior of any proxy or other server in the path of the downstream connection 246. Referring to FIG. 13, operation 270 of the present invention tolerant of the potential presence of a proxy server is shown. A request 242 to initiate a WebSocket connection results in the creation of an HTTP connection upstream that happens to route to a proxy server 274. A corresponding HTTP connection 276 is, in turn, created and routes to the gateway server 42. As before, this connection is not terminated but rather maintained open as connection 278. An intervening proxy sever 274 will typically maintain the corresponding connection 278' open, though the exact behavior of the proxy server 274 is determined by the local configuration of the proxy server 274. Although the gateway server 42 may maintain open the connection 278, the proxy server 274 may buffer downstream transmitted data or, as a matter of configuration policy, terminate the connection 278" altogether. In either event, the Web-browser client receives limited data, data subject to arbitrary latencies determined by the proxy server 274, or a termination of all data delivery.

In accordance with the present invention, the gateway server 42 will autonomously transmit heartbeat packets through the open downstream connection 278 whenever the connection becomes idle for longer than a threshold period of time. In the presently preferred embodiments, the heartbeat threshold is five seconds. Should the WebSocket emulation layer 80 fail to receive any data through the connection 278" in excess of the heartbeat period, the presence of a proxy server is presumed and a disconnect is sent upstream through the connection 278", provided the connection 278" was not terminated by the proxy server 274. The disconnect will result in a flush of any buffered data held by the proxy server 274. A new connection 280 to the gateway server 42, preferably using the HTTPS protocol, is established. The connection 280 is again kept open as a persistent downstream connection 282. A connection using the HTTPS protocol is, by default, not preferred due to the greater overhead on both the Web-browser client 52 and gateway server 42 to establish and process data through the connection. The HTTPS connection is, however, preferred where an intervening proxy server 274 is detected since the protocol will almost always be passed through the proxy servers 274 without buffering or interruption. Where an HTTPS connection cannot be established, a fallback to long-polling is preferably implemented. The downstream connection 282 can therefore be effectively maintained persistent even in the presence of proxy servers 274. Any Server-Sent Events that remain unacknowledged in the event of the connection failure 278" are resent automatically. Consequently, the integrity of the downstream connection is maintained. A similar heartbeat mechanism is preferably implemented on the Web-browser client 52, preferably in the WebSocket emulation layer 80, to allow the gateway server to detect upstream connection limitations.

Thus, a system and methods for achieving bidirectional Web-browser client communication, which is vital for real-time Web applications, have been described. An emulated WebSocket server system enables conventional pre-HTML5 compliant Web-browsers to immediately support bidirectional, full-duplex binary and text communication. Therefore, complex conventional distributed Web application architectures can be avoided. Instead, through use of the present invention, Web-applications can directly communicate with backend services using native protocols transported through an emulated WebSocket over HTTP.

Figure 14:
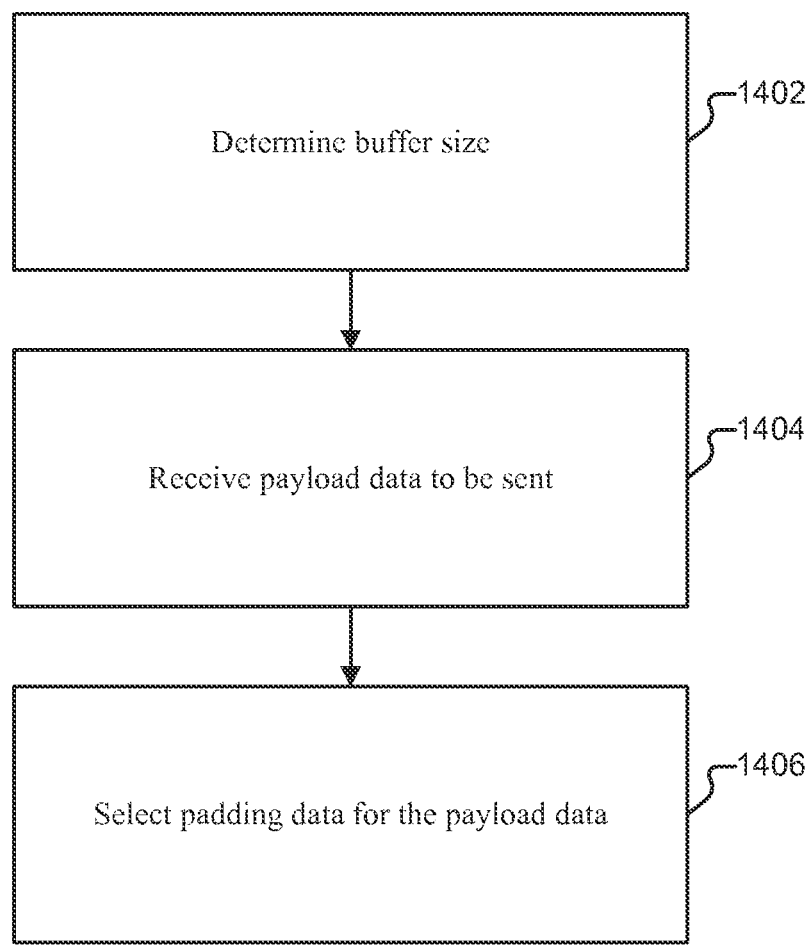
FIG. 14 is a flowchart illustrating an embodiment of a process for selecting padding data.

FIG. 14 is a flowchart illustrating an embodiment of a process for selecting padding data. The process of FIG. 14 may be implemented in client system 32, gateway server 42, origin server 34, target server 36, target server 38, and/or proxy 274. In some client browsers (e.g., browser of client 52), such as a browser on an Android operating system of Google Inc. of Mountain View, Calif., HTTP response payload data is delivered to an application (e.g., application 152) in segments of predetermined size (e.g., 4K) until the response is complete. This causes an HTTP response received at a client that is less than the predetermined size (e.g., less than 4K in size) to be buffered and not delivered to the application (e.g., application 152) until the predetermined size amount of data has been received, causing undesirable delays (e.g., increased latency) in data delivery to the application. This may also apply to HTTP request payload data, causing a partial HTTP request of less than a predetermined size to be not written to the network by the client. A server-side HTTP stack may exhibit similar behavior such that a partial HTTP request of less than predetermined size is not delivered to the application code at the HTTP server.

At 1402, a buffer size is determined. In some embodiments, determining the buffer size includes determining a buffer size and/or an amount of data needed to be received by a receiver before received data is delivered to an application of the receiver from a buffer of the receiver. For example, the amount of data needed to be received by a web browser before the web browser delivers the received data to an application of the web browser is determined. In some embodiments, determining the buffer size includes receiving information about a receiver of the data. For example, information about a type, a model, a property, a performance statistic, a component, a web browser version, and/or an application of a receiver is utilized (e.g., information is mapped to known buffer size) to determine the buffer size. In some embodiments, the buffer size is determined at least in part by performing a test to discover and/or verify the buffer size. For example, test communications of a predetermined unit size (e.g., 1 Kb, 100 byte, or 1 byte, etc.) is successively sent (e.g., with pauses in between communications) until it is detected that the communication has been received at an application of the receiver from a buffer of the receiver. The test may be performed again to verify the determined buffer size.

At 1404, payload data to be sent is received. In some embodiments, receiving the payload data includes receiving data to be sent to a receiver and delivered to an application of the receiver without the data being trapped in a buffer of the receiver. The payload data may be an HTTP response or HTTP request payload data to be sent to a client or a server (e.g., to be sent to client system 32, gateway server 42, origin server 34, target server 36, target server 38, or proxy 274). In some embodiments, the payload data is received for communication between client 52 and gateway server 42, client browser 52 and gateway server 42, encapsulated application 152 and gateway server 42, bridge app 158 and gateway server 42, client 52 and proxy 274, and/or iframe 96 and gateway server 42. For example, the payload data is received for communication via a communication connection emulating a real-time, full-duplex and bidirectional communication channel (e.g., WebSocket connection). In some embodiments, the payload data to be sent is received in WebSocket emulation layer 80. In some embodiments, the payload data is received to be sent via redirection processing flow 210. In some embodiments, the payload data is received to be sent via connection 246, 248, 278, 278' or 282 (e.g., for transmission data downstream from gateway server 42 to web browser 52). In some embodiments, the payload data is received to be sent via connection 244, 256, 272, 276, or 280 (e.g., upstream communication of WebSocket emulation).

At 1406, padding data for the payload data is selected. In some cases it is desirable to minimize the amount of additional bandwidth due to the padding data. In some embodiments, the HTTP response and/or request payload is padded with padding data and compressed (e.g., using a compression algorithm/protocol/method such as gzip or "deflate"), to reduce the bandwidth of sending the padding data. The received compressed payload is decompressed by the receiver (e.g., allowing the response and/or request data to reach the required predetermined size).

Is some cases, the computing overhead of compressing the payload data (e.g., compressing the original data to be sent as well as the padding data) would negatively affect scalability and introduce increased computing and memory resource utilization. In some embodiments, compression is not utilized and the HTTP response and/or request payload is padded with uncompressed padding data. In some embodiments, the original data content is sent uncompressed in a compressed data stream as a literal frame in the compression protocol, (e.g., type 00 block/frame with 5 bytes of total overhead, including length, in the "deflate" compression protocol). This may eliminate the need for additional computing/memory resources required to perform the compression by the sender and/or the decompression by the receiver.

In some embodiments, compressed padding data may be sent as a separate compressed frame/block from the uncompressed frame/block of the payload data using a compression protocol. In some embodiments, the padding data of a predetermined size (e.g., 4K) is precomputed using a fixed dictionary of the compression protocol (e.g., to save bandwidth by eliminating the need to provide the compression dictionary to the receiver). For example, 4K amount pad data is compressed down to 28 bytes. In some embodiments, the compressed padding data is precomputed and added to the HTTP response payload (e.g., including the original data contents in the uncompressed literal frame of the compression protocol) as a constant (e.g., requiring minimal computing overhead for compression because the same precomputed compressed padding data of the predetermined size can be added each time). In some embodiments, the amount of padding data is adjusted to allow original content and/or padding data to be byte aligned in a desired manner.

In some embodiments, the amount of padding data is minimized by only adding padding data required to reach the predetermined size. For example, if 4K amount of data is required to flush the data to the application and the original data is 3K in length, then only 1K of padding data is added. In some embodiments, multiple different sizes of compressed padding data are precomputed and one or more of the precomputed padding data is selected and added to the outbound response payload in a manner that minimizes the size of the padding data but allows the response payload to reach the predetermined size (e.g., data is padded to the next 4K boundary such that the browser will deliver the data to the application immediately upon arrival at the client).

In some embodiments, the total amount of padding data (e.g., either compressed or decompressed) added is minimized by batching together more than one message before adding the padding data. For example, if 4K segments of data are required by the browser before being provided to the application and the original data is to be sent in three writes, each of 2K in size, the three writes are combined together (i.e., 6K total) and 2K amount of padding data is added to reach the 4K boundary (i.e., 8K total).

Figure 15:
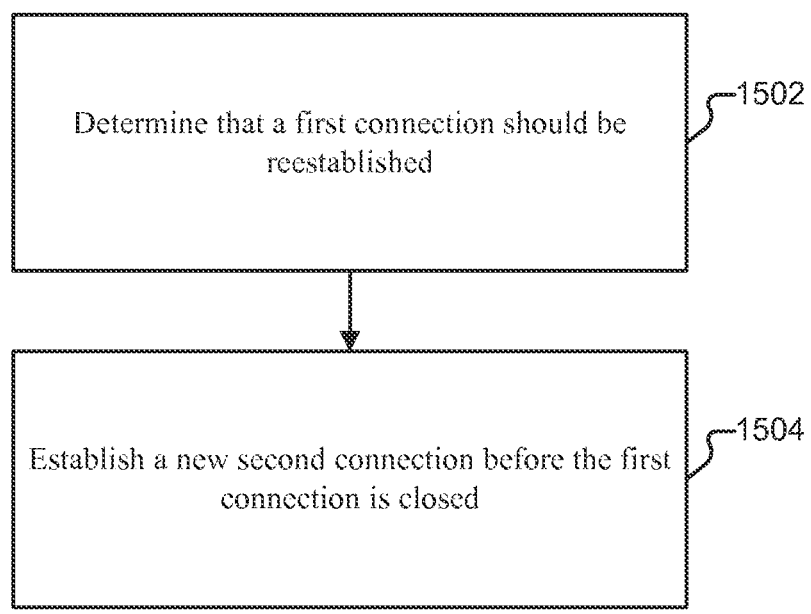
FIG. 15 is a flowchart illustrating an embodiment of a process for establishing a new connection.

HTTP client runtimes such as Flash, Silverlight and Java have a streaming capable HTTP response implementation, allowing fragments of the response to be consumed without waiting for the entire document to be transferred. However, in some client runtimes (e.g., JavaScript HTTP client runtime) a notification is provided each time new data arrives in the response body, but the aggregated response builds up. When a certain amount of data builds up on the client, it may be beneficial to let the response complete normally, letting the browser reclaim all memory associated with the aggregated response, and then reconnect the downstream connection with a new HTTP request. In some embodiments, the amount of data that the client is willing to build up between garbage collecting reconnects can be configured statically and/or dynamically. FIG. 15 is a flowchart illustrating an embodiment of a process for establishing a new connection. The process of FIG. 15 may be implemented in client system 32, gateway server 42, origin server 34, target server 36, target server 38, and/or proxy 274.

At 1502, it is determined that a first connection should be reestablished. The connection to be reestablished may be at least a part of one or more connections emulating a real-time, full-duplex, and bidirectional connection (e.g., emulating a WebSocket connection). In some embodiments, the connection to be reestablished is one or more of the following connections: 244, 246, 248, 256, 272, 276, 278, 278', 280, or 282. In some embodiments, determining that the first connection should be reestablished includes detecting that a memory resource has reached a threshold level. For example, it is detected that memory associated with the aggregated response of an HTTP response exceeds a threshold amount and that the memory should be reclaimed for increased performance. In some embodiments, determining that the first connection should be reestablished includes detecting that an amount of aggregated HTTP response data has reached a threshold amount.

At 1504, a new second connection is established before the first connection is closed. In some embodiments, when the limit is exceeded, a "reconnect" command frame is sent by the server to complete the response. In some embodiments, the "reconnect" frame must be the last frame on the downstream response during a reconnect, otherwise undetectable loss could occur for subsequent frames. In some embodiments, allowing the response to complete normally and reconnecting the downstream may introduce a potentially undesirable delay and latency in data transmission. In some embodiments, the client establishes a new downstream connection (e.g., while the previous connection is still active) when desired (e.g., based on how much data has already been buffered on the current connection and the network connect latency). In some embodiments, when the server detects the new downstream connection, it sends a RECONNECT command on the previous downstream connection, closes the previous downstream connection, and writes all further data messages to the new downstream connection. This may allow the new downstream connection to be utilized while the previous downstream connection is in the process of being closed. This may also reduce the latency for messages written immediately to the new downstream rather than waiting for the new downstream HTTP request to arrive after the previous downstream connection completes.

In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a hardware processor configured to:
      use a data compression algorithm to compress uncompressed communication data in a first data grouping, wherein a header of the first data grouping identifies that the first data grouping includes uncompressed contents; and
      select a second data grouping, wherein the second data grouping includes compressed padding data configured to fill a buffer of a receiver to at least a predetermined size; and
   a communication interface coupled to the processor and configured to send the first data grouping and the second data grouping to a recipient that includes the buffer and the receiver.

2. The system of claim 1, wherein the first data grouping is a block specified by the data compression algorithm.

3. The system of claim 1, wherein the data compression algorithm is deflate.

4. The system of claim 3, wherein the header of the first data grouping specifies a type 00 data grouping identifier of the deflate data compression algorithm.

5. The system of claim 1, wherein the data compression algorithm is gzip.

6. The system of claim 1, wherein the uncompressed contents includes a payload data to be delivered to an application of the receiver.

7. The system of claim 1, wherein the first data grouping and second data grouping are sent to a web browser of the receiver.

8. The system of claim 1, wherein the first data grouping and second data grouping are sent as an HTTP response in response to an HTTP request.

9. The system of claim 1, wherein the second data grouping has been precomputed using the data compression algorithm prior to the selection of the second data grouping.

10. The system of claim 1, wherein the receiver is an HTTP server.

11. The system of claim 1, wherein the receiver is an HTTP client.

12. The system of claim 1, wherein the compressed padding data decompresses to the predetermined size.

13. The system of claim 1, wherein selecting the second data grouping includes selecting the second data grouping among a plurality of precomputed data groupings.

14. The system of claim 1, wherein selecting the second data grouping includes selecting the second data grouping based at least in part on a size of the uncompressed contents.

15. The system of claim 1, wherein selecting the second data grouping includes selecting the second data grouping such that a combined size of an uncompressed size of the compressed padding data and a size of the uncompressed contents is a multiple of the predetermined size.

16. The system of claim 1, wherein the first data grouping includes aggregated contents of a plurality of messages originally configured to be sent separately.

17. The system of claim 1, wherein when it is detected that an amount of aggregated HTTP response data received by the receiver has reached a threshold amount, a reconnect message to reconnect a connection used to send the first data grouping and the second data grouping is sent using the communication interface.

18. The system of claim 17, wherein in response to the reconnect message, a new connection is established before the connection used to send the first data grouping and the second data grouping is closed.

19. The system of claim 1, wherein the predetermined size has been determined based at least in part on the receiver.

20. The system of claim 1, wherein sending the first data grouping and the second data grouping includes sending the first data grouping and the second data grouping via a communication connection at least in part emulating a Web Socket connection.

21. A method, comprising:
   using a data compression algorithm to compress uncompressed communication data in a first data grouping, wherein a header of the first data grouping identifies that the first data grouping includes uncompressed contents;
   using a processor to select a second data grouping, wherein the second data grouping includes compressed padding data configured to fill a buffer of a receiver to at least a predetermined size; and
   sending the first data grouping and the second data grouping to a recipient that includes the buffer and the receiver.

22. A computer program product, the computer program product being embodied in a non-transitory computer readable storage medium and comprising computer instructions for:
   using a data compression algorithm to compress uncompressed communication data in a first data grouping, wherein a header of the first data grouping identifies that the first data grouping includes uncompressed contents;
   selecting a second data grouping, wherein the second data grouping includes compressed padding data configured to fill a buffer of a receiver to at least a predetermined size; and
   sending the first data grouping and the second data grouping to a recipient that includes the buffer and the receiver.

* * * * *